United States Patent
Kinnaird et al.

(10) Patent No.: US 7,601,390 B1
(45) Date of Patent: Oct. 13, 2009

(54) PROTECTIVE SYSTEM FOR CONCRETE SEWER APPLICATIONS

(75) Inventors: Michael Gates Kinnaird, Durham, NC (US); Vernon Leon Tyson, Durham, NC (US); Ronnie Steven Padgett, Garner, NC (US)

(73) Assignee: Sewerkote LLC, Chapel Hill, NC (US)

( * ) Notice: Subject to any disclaimer, the term of this patent is extended or adjusted under 35 U.S.C. 154(b) by 575 days.

(21) Appl. No.: 11/290,223

(22) Filed: Dec. 1, 2005

(51) Int. Cl.
*B05D 5/10* (2006.01)

(52) U.S. Cl. .............. 427/207.1; 428/143; 427/230; 427/236; 427/140; 427/142; 118/317

(58) Field of Classification Search ............... 427/207.1
See application file for complete search history.

(56) References Cited

U.S. PATENT DOCUMENTS

| | | | |
|---|---|---|---|
| 4,265,957 A * | 5/1981 | Severance et al. | 428/143 |
| 4,581,433 A | 4/1986 | Potter et al. | |
| 5,405,218 A | 4/1995 | Hyde-Smith | |
| 5,415,499 A | 5/1995 | Hyde-Smith et al. | |
| 5,879,501 A | 3/1999 | Livingston | |
| 6,005,062 A | 12/1999 | Hansen et al. | |
| 6,369,189 B1 | 4/2002 | Naderhof et al. | |
| 6,451,874 B1 | 9/2002 | Purgett et al. | |
| 6,632,475 B1 | 10/2003 | Bleggi | |
| 6,730,353 B2 | 5/2004 | Robinson | |
| 7,189,429 B2 * | 3/2007 | Robinson | 427/230 |
| 7,279,196 B2 | 10/2007 | Hume | |

FOREIGN PATENT DOCUMENTS

WO   WO98/37929   9/1998

OTHER PUBLICATIONS

Anonymous, Bayer MaterialScience "The Chemistry of Polyurethane Coatings", Brochure pp. through 3 only included. File on CD.
O'Malley, Cynthia L. KTA-Tator, Inc. "Polyurea Coatings. If You Knew What Could Go Wrong . . . " URL http:://www.ktat.com/knowledge/PACE2005/Polyurea%20Coatings%20CLO.pdf SA CD.
Natarajan, A "Polyurea-based Elastomeric Coating: The Wonder Coating", publ May 24, 2005, web article. File on CD.

* cited by examiner

*Primary Examiner*—Michael Barr
*Assistant Examiner*—Ryan Schiro

(57) ABSTRACT

This invention relates to a method of protecting concrete sewer pipe, manholes, lift stations, pump stations, wet wells, sewage treatment plant components, and septic tanks and/or septic tank components comprising coating said concrete items by rolling, spraying, or brushing on a coating system consisting essentially of a primer, intermediate coat and topcoat. Each coat is a polymeric coating prepared in situ by combining a hardener with a prepolymer formulation. The pepolymer is an amine-containing material, resulting in a polyurea-based coating. The chief advantages of the coating are that it can be applied utilizing conventional, simple equipment, and the increased drying time allows for excellent adhesion on the substrate. Also, it is a tough elastomeric material resistant to attack by water or the sulfuric acid microbial metabolic end-product.

3 Claims, No Drawings

PROTECTIVE SYSTEM FOR CONCRETE SEWER APPLICATIONS

BACKGROUND OF THE INVENTION

It is well-known to those skilled in the art that bacterial action in sewage (human or animal) produces a complex cascade of products, two of the terminal products of which are hydrogen sulfide and sulfuric acid, the latter of which results from bacterial and/or chemical action on the hydrogen sulfide. The bottom line is that sulfuric acid is produced in quantities that are sufficient to attack the concrete structures so frequently used in handling sewage. The result is the destruction of the concrete component(s), most especially above the water line. In extreme cases, one inch or more of concrete binder can be lost in a year, causing the eventual collapse of the structure. Another problem associated with sulfuric acid attack is that the system becomes more and more porous, allowing dirt and water to infiltrate. This effectively reduces the capacity of the waste treatment system, causing expensive repairs and/or necessitating the addition of plant capacity.

PRIOR ART

Hume (U.S. Pat. No. 6,706,384)

Hume discloses a multilayer system for waste water system rehabilitation, consisting of a spray-applied, multilayer liner, consisting of a primer, first moisture barrier layer, a foam interlayer, and a second moisture barrier layer, or alternatively, a bilayer system consisting of a primer and a hard outer layer. The foam layer, if used, is preferably a polyurea or polyurethane. The patent is rather vague as to the specifics used, but all components are rapid-curing, preferably so rapidly-curing that mixing in the spray gun or preferably in the air between the gun and the wall. The primer is said to possibly be an epoxy, and rigidity is an important part of the whole concept.

In the real world, it takes time for a coating to adequately penetrate concrete. Although the Hume art is creative, the short, essentially zero pot life leaves much to be desired in terms of bonding adequately to the concrete substrate. This problem is general for short-pot life coatings, as will be shown below. As a general rule, polyurea coatings, and other short pot live coatings, contain a multitude of air bubbles, due to the fact that they are spray-applied at high pressures, and air is entrained that cannot escape in the short time the material is semi-fluid. This necessitates very thick coatings, on the order of 100-250 thousandths of an inch.

Also, a rigid material is not always the best choice for a concrete liner. In particular, epoxies have a reputation for being brittle and cracking in service in sewage applications. Therefore, an elastomeric material would provide a more-forgiving coating. The polyurea is said also to be quite rigid.

Another drawback to the Hume invention is the necessity for expensive, sophisticated application equipment. Heated, plural-head sprayers cost tens of thousands of dollars, require multiple trained experts to run, and if the ratio is not correct, a large amount of material can be applied that is useless. The materials are applied at hundreds or thousands of pounds of pressure, representing hazards due to high pressure, and overspray is a major problem, including for personnel that are nearby. Therefore, a more applicator-friendly system is to be desired.

Finally, the use of multiple chemistries is confusing and complicated. A single-chemistry technique, especially one that provides a protective barrier in each and every layer, would be preferable. In this way, any imperfections in any particular layer would be compensated for by the layers above or below, giving an extra measure of protection due to the forgiving nature of the overall system.

Carbonell, et. al. (U.S. Pat. No. 6,127,000)

Carbonell discloses a method and compositions for protecting infrastructure involving dissolving a fluorocarbon polymer in carbon dioxide, and spray applying this coating to the structures to be protected. Presumably this could include manholes and other sewer infrastructure. However, carbon dioxide is capable of displacing oxygen, and is toxic in high concentrations, so presents significant hazards in enclosed environments. Also, the carbon dioxide/fluoropolymer mixture is under high pressure, and represents substantial danger during transport and handling. Fluoropolymers are also under increasing scrutiny due to environmental concerns, with 3M, a major manufacturer, pulling their biggest seller class off the market voluntarily. Finally, both the carrier and fluoropolymers are expensive. Therefore a less-expensive, more acceptable alternative is desirable.

Miller (U.S. Pat. No. 6,056,997)

Miller discloses essentially a long-term disinfectant approach to manhole corrosion inhibition, wherein after cleaning, magnesium hydroxide or magnesium oxide are spray applied to the exposed concrete surface. The high alkalinity inhibits bacterial growth of the type that produces sulfuric acid. The chief advantage of such technology over sodium hydroxide are in the safety and longer-term impact of the magnesium-based technique. However, these magnesium salts are water soluble as well as sodium hydroxide, and will eventually wash off, rendering the surface subject to attack once again. This is especially true for areas where infiltration of outside water occurs, which is a highly-prevalent situation in manholes. Thus, a more-permanent solution is desirable. Similar art is disclosed in U.S. Pat. Nos. 5,620,744 (Huege), 5,7683,748 (Gunderson).

U.S. Pat. No. 5,962,144 (Primeaux)

Primeaux discloses polyurea elastomer systems with improved adhesion to substrates, which is obtained by utilizing castor oil or other primary-hydroxyl-containing hydrophobic chemical and an isocyanate in combination as a primer. The primer system is said to be especially useful on wet substrates, where it will adhere despite the presence of moisture. This primer is said to be especially-useful for improving the adhesion of polyurea elastomer systems. However, the fact that such a primer is necessary indicates the inherent weakness of conventional, short-pot-life polyureas for concrete applications. Also, although the primer is said to function even with the presence of moisture on the surface, moisture is well known to those in the art to cause pinholing in protective liners, and so could not be tolerated in a sewer application. Finally, it would be preferable if every layer of a multilayer system provides barrier properties for the reasons discussed above. Therefore, a better system is desirable.

U.S. Pat. No. 5,795,104 (Schanze)

Schanze discloses a mixture of a silicate solution and a hydrolyzable component such as an orthoester or dialkyl carbonate. The pot life is adjustable, being from a few seconds to 10 minutes. The method of application that Schanze discloses involves sealing the pipe, applying the separate components in a manner wherein they mix in the sealed-off pipe, and after an efficacious curing time, washing the excess away. This system is cumbersome at best, and would be impractical for large pipelines or manholes. Therefore, an improved system for protecting sewer structures is still to be desired.

U.S. Pat. No. 5,415,499 (Hyde-Smith, et al.)

Hyde-Smith discloses a method for repairing existing manholes, consisting of a fast-curing elastomeric material that is spray-applied, preferably on top of a silane-containing primer coat. In addition to the disadvantages of low potlife polyureas mentioned above, this technology suffers from the high toxicity of silanes, which would make working with the primer dangerous. Therefore, a more user-friendly system is desirable.

DETAILED DESCRIPTION OF THE INVENTION

The present invention relates to an improved method of protecting concrete sewer pipe, manholes, lift stations, pump stations, wet wells, sewage treatment plant components, and septic tanks and/or septic tank components involving a polyurea coating system. There are a plurality of coats applied, and the pot life of all of them is such that they may be brush- or roller-applied, as well as sprayed. The basic chemistry of all of the layers is the same, so all of the layers provide barrier protection of the concrete, making the whole system forgiving to minor application errors. The primer also has time to soak into the concrete, forming a coating that is integral to the concrete, greatly inhibiting delamination of the coating.

The method comprises coating said concrete items by rolling, spraying, or brushing on a coating system consisting essentially of:

1. A primer coat, consisting essentially of an "A" component which is a mixture of:
   a. At least one amino-terminated prepolymer of the structure $(NHR)n[X]x[Y]y$, wherein N is a nitrogen atom, H is a hydrogen atom, R is an alkyl, aryl or alkylaryl radical, X and Y are interchangeably propylene glycol- or tetramethylene glycol units, x and y are integers from 0 to 1000, with the exception that the number of tetramethylene glycol units is never zero for all prepolymers, i.e. at least one prepolymer is an amino-terminated polytetramethylene glycol ("PTMEG") oligomer, with at least one tetramethylene glycol unit in it's structure, the total amount of such prepolymer(s) being from about 1 to about 30 percent by weight of the total formulation, and wherein the particular prepolymer components are chosen and present in such a composition ratio so as to render the working pot life of the combined A/B mixture at least 15 minutes, and
   b. At least one solvent chosen from the group containing lower ketone solvents (acetone, methyl ethyl ketone, etc., up to around a 10-carbon ketone), lower ester solvents (propylene glycol methyl ether acetate, methyl acetate, ethyl acetate, etc., up to around a 15-carbon ester solvent), aromatic, aliphatic, and alkyl-aryl hydrocarbons, said solvents in sum comprising from about 70 to about 95 percent of the A component, and
   c. Other optional additives such as thickeners, opacifying and/or coloring agents, and 2. An intermediate coat, consisting essentially of: an "A" component which is a mixture of:
   a. At least one amino-terminated prepolymer of the structure $(NHR)n[X]x[Y]y$, wherein N is a nitrogen atom, H is a hydrogen atom, R is an alkyl, aryl or alkylaryl radical, X and Y are interchangeably propylene glycol- or tetramethylene glycol units, x and y are integers from 0 to 1000, with the exception that the number of tetramethylene glycol units is never zero for all prepolymers, i.e. at least one prepolymer is an amino-terminated polytetramethylene glycol ("PTMEG") oligomer, with at least one tetramethylene glycol unit in it's structure, the total amount of such prepolymer(s) being from about 20 to about 90 percent by weight of the total formulation, and wherein the particular prepolymer components are chosen and present in such a composition ratio so as to render the working pot life of the combined A/B mixture at least 15 minutes,
   b. At least one solvent chosen from the group containing lower ketone solvents (acetone, methyl ethyl ketone, etc., up to around a 10-carbon ketone), lower ester solvents (propylene glycol methyl ether acetate, methyl acetate, ethyl acetate, etc., up to around a 15-carbon ester solvent), aromatic, aliphatic, and alkyl-aryl hydrocarbons, said solvent (mixture) comprising from about zero to about 40 percent by weight of the total A component, and
   c. A filler or fillers, being at least one chosen from the group containing ceramic microspheres, glass microspheres, plastic microspheres, mica, clays, barytes, molybdenum sulfide, iron oxide, titanium dioxide and/or other metal oxides, such filler or fillers comprising from about 5 to about 80 percent by volume of the whole "A" component,
   d. A thickener or thickeners, of such type and amount such that the final formulation, exhibits excellent vertical "cling", yielding a dry film of about 40 thousandths of an inch or more, and
   e. Other optional additives such as opacifying and/or coloring agents, defoamers and the like, and
   Wherein said intermediate coat "A" component is admixed with an appropriate isocyanate optionally dissolved in a solvent (as described above) in an equivalent ratio of from about 1 to about 10 with respect to the prepolymer component, and which combined A-component/isocyanate combined intermediate coat may be applied multiple times to build up heavier final thicknesses of the coating system, and 3. A topcoat consisting essentially of an "A" component which is a mixture of:
   a. At least one amino-terminated prepolymer of the structure $(NHR)n[X]x[Y]y$, wherein N is a nitrogen atom, H is a hydrogen atom, R is an alkyl, aryl or alkylaryl radical, X and Y are interchangeably propylene glycol- or tetramethylene glycol units, x and y are integers from 0 to 1000, with the exception that the number of tetramethylene glycol units is never zero for all prepolymers, i.e. at least one prepolymer is an amino-terminated polytetramethylene glycol ("PTMEG") oligomer, with at least one tetramethylene glycol unit in it's structure, the total amount of such prepolymer(s) being from about 10 to about 90 percent by weight of the total formulation, and wherein the particular prepolymer components are chosen and present in such a composition ratio so as to render the working pot life of the combined A/B mixture at least 15 minutes,
   b. At least one solvent chosen from the group containing lower ketone solvents (acetone, methyl ethyl ketone, etc., up to around a 10-carbon ketone), lower ester solvents (propylene glycol methyl ether acetate, methyl acetate, ethyl acetate, etc., up to around a 15-carbon ester solvent), aromatic, aliphatic, and alkyl-aryl hydrocarbons, said solvents in sum comprising from about 10 to about 90 percent of the A component, and c. A filler or fillers, being at least one chosen from the group containing ceramic microspheres, glass microspheres, plastic microspheres, mica, clays, barytes, molybdenum sulfide, iron-, titanium- or other metal oxides, said filler or fillers comprising from about 10 to about 80 percent by volume of the final "A" component, d. Other optional additives such as thickeners, opacifying and/or coloring agents, and Wherein said top coat "A" component is admixed with an appropriate isocyanate optionally dissolved in a solvent as described above in an equivalent ratio of from about 1 to about 10 with respect to the prepolymer component, such that the topcoat thickness is from about 5 to about 20 thousandths of an inch when dry.

The prepolymer is either a single component or a blend. An example of polyurea prepolymers that find utility in the present invention are the "Versalink" polyether polyamines manufactured by Air products. The backbone of these oligomeric amines are poly(tetrahydrofuran), also known as poly-tetramethylene glycol ("PTMEG"). The endcaps are typically aminobenzoic acid esters of the PTMEG backbone. These materials make polymers upon addition of traditional isocyanates, such as those of methylene-bis-phenylisocyanate ("MDI"). The polymers are excellent water barriers, and the pot life, which depends on the solvent concentration as well as that of the other additives and the particular choice of isocyanate, is typically never less than 15 minutes at ambient temperatures less than about 100 degrees F., unless a catalyst is used. Examples of the Versalink prepolymers that find utility in the present invention include, but are not limited to, Versalink P-250, P-650, P-1000, P-2000, and P-3000. Other PTMEG-based amino-terminated prepolymers would also find utility in the present invention, provided that alone or in combination with other amino-terminated prepolymers, the pot life is sufficient to allow excellent adhesion to concrete and/or other layers of a coating system. The amount of such prepolymers in the particular coating component depends on whether the coating is a primer, intermediate or top coat. For a primer, the best concentration is 5-30 percent by weight, with most of the balance being solvent.

It has been surprisingly found that aliphatic amines, diamines and triamines also find utility in the instant invention, although not in high concentrations compared to the Veralink PTMEG-based aminobenzoate-terminated prepolymers. These are exemplified by the Jeffamine and XTJ prepolymers sold by the Huntsman Corporation. These are generally based on polypropylene glycols of various molecular weights that are then reacted with ammonia to form amino-terminated polypropylene glycols. Alone, these materials react virtually instantaneously with isocyanates, necessitating the complex, plural-head sprayers discussed above to apply them. However, surprisingly, it has been found that these materials can be admixed in with the PTMEG-based aminobenzoates discussed above, and provided their concentration is not overly high, a good pot life can nonetheless be obtained. The concentration of the material allowable depends on the rest of the formulation as well as the exact type of aliphatic amine or polyamine. As a general rule, no more than an 80/20 mixture of PTMEG-based aminobenzoate/aliphatic amine can be utilized for pot lives of 15 minutes or greater, although higher concentrations of aliphatic amines are potentially useful as well. It is of course understood by those skilled in the art that other aliphatic amines or polyamines will find utility in the instant invention.

Solvents that find utility in the instant invention are typically those compatible with the prepolymer or prepolymer blend. The exact nature of the solvent or solvent blend that is chosen depends on the nature of the coating and the desired cure time, etc. Solvents that find utility in the present invention include, but are not limited to: acetone, methyl ethyl ketone or other ketone solvents with less than 10 carbon atoms in their carbon skeleton, propylene glycol methyl ether acetate, ethylene glycol methyl ether acetate, and other alkyl ether acetates with less than 20 carbon atoms in their carbon skeleton, ethers such as diethyl ether, tetrahydrofuran, and other ether solvents with less than about 12 carbon atoms in their carbon skeleton, benzene, toluene, xylene, and other aromatic-based solvents with less than about 12 carbon atoms in their carbon skeletons. This list is representative, not exhaustive.

The coatings of the instant invention are all two-component coatings, with an "A" component being mixed with a hardener or "B" component in the field just prior to application. The hardeners of the instant invention are isocyanates with at least two isocyanate groups per molecule. The exact choice of isocyanate is determined by the desired parameters for the formulation, such as cost, pot life, compatibility with solvents and other formulation (A or B side) components, etc. Such isocyanates are well-known to those skilled in the art. Examples include, but are not exclusively: methylene-bis-phenyl isocyanate (MDI) or polymers or addition products thereof, toluene di-isocyanate ("TDI") or polymers or addition products thereof, as well as other aromatic isocyanates or polyisocyanates, aliphatic isocyanates such as hexamethylene-di-isocyanate ("HDI"), or dimers, trimers, and other addition products thereof, isophorone di-isocyanate ("IPDI"), or dimers, trimers, and other addition products thereof, or alternatively pre-polymers made from blending a polyether polyol and an isocyanate, or mixtures or combinations of these. The exact quantity of isocyanate in the B side formulation depends on the choice of solvent and nature of the isocyanate or isocyanates. Typically, the isocyanate is present from about 60 to about 100% by weight in the "B" side formulation. The exact amount of "B" side formulation mixed with "A" side formulation depends on the concentration of reactive components in the "A" side formulation, as well as desired stiffness, pot life, and other similar considerations known to those skilled in the art. Generally, the equivalent ratio of reactive components in the "A" and "B" sides is close to 1.0, but ratios up to 10 to 1 for the isocyanate equivalents to reactive "A" side components are potentially useful. These higher ratios would lead to "moisture" curing coatings, and have long pot lives, although the moisture cure aspect can lead to foaming during curing. Therefore, more preferable A/B equivalent ratios are between 1:1 and 1:2 (pre-polymer/isocyanate).

For building up thicknesses of coatings, and to reduce the costs of the overall coatings, fillers are typically added to the "A" side. Conventional fillers utilized in coatings find utility in this method as well, except that the fillers should not detract from the water-resistance of the coating, and should be compatible with the prepolymer and/or the final polymer. Those skilled in the art will know of many possible fillers that could find utility in the present invention. Examples of fillers that find utility in the instant invention include, but are not limited to: hollow microspheres such as those made of ceramic, glass or plastic, mica or other platy minerals, clays, such as bentonites, hectorites, or modified clays such as those made by adding long-chain cationic amines to clays, barites, magnesium aluminosilicates, crushed glass, or silica.

Other potential additives are known to those skilled in the art. Pigments or pigment dispersions are useful to provide aesthetic appeal, as well as provide ready visibility of incomplete coating, thickeners are used to reduce the tendency of the applied, uncured coating to sag off. Water-scavenging materials can make the "A" side foam less when mixed with the "B" side. Defoamers can eliminate foam that forms during the mixing and/or application process. The exact nature and concentration of these additives are found by experimentation processes known to those skilled in the art.

EXAMPLE

A coating system was prepared by mixing the following proportions (W/W) of ingredients utilizing conventional (low-shear) mixing equipment:

| Parts by weight | Material |
|---|---|
| | PRIMER |
| 13.9 | Versalink P-1000 |
| 3.1 | Jeffamine D-2000 |
| 33 | Propylene glycol methyl ether acetate |
| 50 | acetone |
| | INTERMEDIATE COAT |
| 60.1 | Versalink P-1000 |
| 3 | Huntsman XTJ-510 |
| 26.5 | Ceramic microspheres |
| 0.1 | Modaflow flow control agent |
| 0.6 | Aerosil R-972 fumed, hydrophobic silica |
| 1 | Cravallac PA4X20 thickener |
| 0.5 | Zoldine MS-Plus drying agent |
| 8.1 | acetone |
| | TOP COAT |
| 40.5 | Versalink P-1000 |
| 40.5 | Mica "3X" |
| 1.7 | Mixture of Degussa 844 Phthalo blue and titanium white tint |
| 16.2 | Propylene glycol methyl ether acetate |
| | HARDENER |
| 79 | Isonate Polymeric MDI |
| 21 | Propylene glycol methyl ether acetate |

The hardener was mixed with the various coating "A" components in the portions below (all by volume) The approximate pot lives at 80 degrees F. were all greater than 15 minutes.

| PRIMER | 5 gallons to 1 quart hardener |
|---|---|
| INTERMEDIATE COAT | 1 gallon to 1 quart hardener |
| TOP COAT | 1 gallon to 1 quart hardener |

A. The three coats were used to coat a manhole that had suffered significant damage due to corrosion, in Garner, N.C. After cleaning it thoroughly with high-pressure water, the surface was dried, but not re-concreted. The primer was spread at a rate of approximately 100 square feet per gallon, in multiple passes, using brushes and rollers. After approximately 45 minutes, the intermediate coat was applied, in one pass, at an approximate rate of 20-40 square feet per gallon. The top coat was then applied about 1 hour later, when the intermediate coat was dry to the touch, in one pass, with brush and/or roller touchup, at a rate of approximately 100-150 square feet per gallon. The resultant product had sufficient integrity to pass a "holiday test" at 10,000 volts with no spots causing sparking in the interior of the manhole, away from the metal rim or stairs.

B. The three coats were used to coat the pieces of a manhole that had not yet been installed. After acid etching with hydrochloric acid solution, and then cleaning it thoroughly with high-pressure water, the surface was allowed to dry. The primer was spread at a rate of approximately 100 square feet per gallon, in multiple passes, using brushes and rollers. After approximately 45 minutes, the intermediate coat was applied, in one pass, at an approximate rate of 20-40 square feet per gallon. The top coat was then applied about 1 hour later, when the intermediate coat was dry to the touch, in one pass, with brush and/or roller touchup, at a rate of approximately 100-150 square feet per gallon The resultant product had sufficient integrity to pass a "holiday test" at 10,000 volts with no spots causing sparking in the interior of the manhole, away from the metal rim or stairs.

We claim:

1. A method for protecting concrete sewer pipe, manholes, lift stations, pump stations, wet wells, sewage treatment plant components, and septic tanks and/or septic tank components comprising coating said concrete items by rolling, spraying, or brushing on a coating system consisting essentially of:

1. A primer coat, consisting essentially of an "A" component which is a mixture of:

1. At least one amino-terminated prepolymer of the structure $(NHR)n[X]x[Y]y$, wherein N is a nitrogen atom, H is a hydrogen atom, R is an alkyl, aryl or alkylaryl radical, X and Y are interchangeably propylene glycol- or tetramethylene glycol units, x and y are integers from 0 to 1000, with the exception that the number of tetramethylene glycol units is never zero for all prepolymers, i.e. at least one prepolymer is an amino-terminated polytetramethylene glycol ("PTMEG") oligomer, with at least one tetramethylene glycol unit in it's structure, the total amount of such prepolymer(s) being from about 1 to about 30 percent by weight of the total formulation, and wherein the particular prepolymer components are chosen and present in such a composition ratio so as to render the working pot life of the combined A/B mixture (wherein B is at least one aromatic isocyanate optionally diluted in a solvent) at least 15 minutes, and 2. At least one solvent chosen from the group containing lower ketone solvents (acetone, methyl ethyl ketone, etc., up to around a 10-carbon ketone), lower ester solvents (propylene glycol methyl ether acetate, methyl acetate, ethyl acetate, etc., up to around a 15-carbon ester solvent), aromatic, aliphatic, and alkyl-aryl hydrocarbons, said solvents in sum comprising from about 70 to about 95 percent of the A component, and 3. Other optional additives such as thickeners, opacifying and/or coloring agents, and wherein said primer coat "A" component is admixed with at least one aromatic isocyanate optionally dissolved in a solvent in an equivalent ratio of from about 1 to about 10 with respect to the prepolymer component, then after an efficacious mixing time, said combined isocyanate/prepolymer primer is applied to a concrete surface multiple times, until the surface appears "shiny" after the solvent evaporates, which coat is roughly 0.5 to 3 thousandths of an inch thick when dry, then 2. An intermediate coat, consisting essentially of: an "A" component which is a mixture of:

1. At least one amino-terminated prepolymer of the structure $(NHR)n[X]x[Y]y$, wherein N is a nitrogen atom, H is a hydrogen atom, R is an alkyl, aryl or alkylaryl radical, X and Y are interchangeably propylene glycol- or tetramethylene glycol units, x and y are integers from 0 to 1000, with the exception that the number of tetramethylene glycol units is never zero for all prepolymers, i.e. at least one prepolymer is an amino-terminated polytetramethylene glycol ("PTMEG") oligomer, with at least one tetramethylene glycol unit in it's structure, the total amount of such prepolymer(s) being from about 20 to about 90 percent by weight of the total formulation, and wherein the particular prepolymer components are chosen and present in such a composition ratio so as to render the working pot life of the combined A/B mixture (wherein B is at least one aromatic isocyanate optionally diluted in a solvent) at least 15 minutes, 2. At least one solvent chosen from the group containing lower ketone solvents (acetone, methyl ethyl ketone, etc., up to around a 10-carbon ketone), lower ester solvents (propylene glycol methyl ether acetate, methyl acetate, ethyl acetate, etc., up to around a 15-carbon ester solvent), aromatic, aliphatic, and alkyl-aryl hydrocarbons, said solvent (mixture) comprising from about 2 to about 40 percent by weight of the total A component, and 3. A filler or fillers, being at least one chosen from the group containing ceramic microspheres, glass microspheres, plastic microspheres, mica, clays, barytes, molybdenum sulfide, iron-, titanium- or other metal oxides, such filler or fillers comprising from about 5 to about 80 percent by volume of the whole "A" component, 4. A thickener or thickeners, of such type and amount such that the final formulation, exhibits excellent vertical "cling", yielding a dry film of about 40 thousandths of an inch or more, and 5. Other optional additives such as opacifying and/or coloring agents, defoamers and the like, and wherein said intermediate coat "A" component is admixed at least one aromatic isocyanate optionally dissolved in a solvent in an equivalent ratio of from about 1 to about 10 with respect to the prepolymer component, and which combined A-component/isocyanate combined intermediate coat may be applied multiple times to build up heavier final thicknesses of the coating system, and 3. A topcoat consisting essentially of an "A" component which is a mixture of:

1. At least one amino-terminated prepolymer of the structure $(NHR)n[X]x[Y]y$, wherein N is a nitrogen atom, H is a hydrogen atom, R is an alkyl, aryl or alkylaryl radical, X and Y are interchangeably propylene glycol- or tetramethylene glycol units, x and y are integers from 0 to 1000, with the exception that the number of tetramethylene glycol units is never zero for all prepolymers, i.e. at least one prepolymer is an amino-terminated polytetramethylene glycol ("PTMEG") oligomer, with at least one tetramethylene glycol unit in it's structure, the total amount of such prepolymer(s) being from about 10 to about 90 percent by weight of the total formulation, and wherein the particular prepolymer components are chosen and present in such a composition ratio so as to render the working pot life of the combined A/B mixture (wherein B is at least one aromatic isocyanate optionally diluted in a solvent) at least 15 minutes, 2. At least one solvent chosen from the group containing lower ketone solvents (acetone, methyl ethyl ketone, etc., up to around a 10-carbon ketone), lower ester solvents (propylene glycol methyl ether acetate, methyl acetate, ethyl acetate, etc., up to around a 15-carbon ester solvent), aromatic, aliphatic, and alkyl-aryl hydrocarbons, said solvents in sum comprising from about 10 to about 90 percent of the A component, and 3. A filler or fillers, being at least one chosen from the group containing ceramic microspheres, glass microspheres, plastic microspheres, mica, clays, barytes, molybdenum sulfide, iron-, titanium- or other metal oxides, said filler or fillers comprising from about 10 to about 80 percent by volume of the final "A" component, and 4. Other optional additives such as thickeners, opacifying and/or coloring agents, and wherein said top coat "A" component is admixed with at least one aromatic isocyanate optionally dissolved in a solvent in an equivalent ratio of from about 1 to about 10 with respect to the prepolymer component, such that the topcoat thickness is from about 5 to about 20 thousandths of an inch.

2. The method of claim 1 wherein the coating system is applied to new concrete, either at the factory, or in the field, or a combination of the two, wherein most of the concrete piece is coated prior to installation, and/or delivery to the jobsite, and "touch-up" coating is applied when the pieces are assembled, but wherein the entire system is repeated during the touch-up process on the uncoated "touch-up" pieces.

3. The method of claim 1 wherein the coating system is field-applied to existing concrete structures, which may or may not have been damaged due to the waste products of biological activity, either with or without adding fresh concrete, grouting, polymer concrete, or other cementitious material to the existing, damaged concrete structure.

* * * * *